Sept. 15, 1936. W. DZUS 2,054,519
FASTENER HANDLE
Filed Aug. 1, 1935
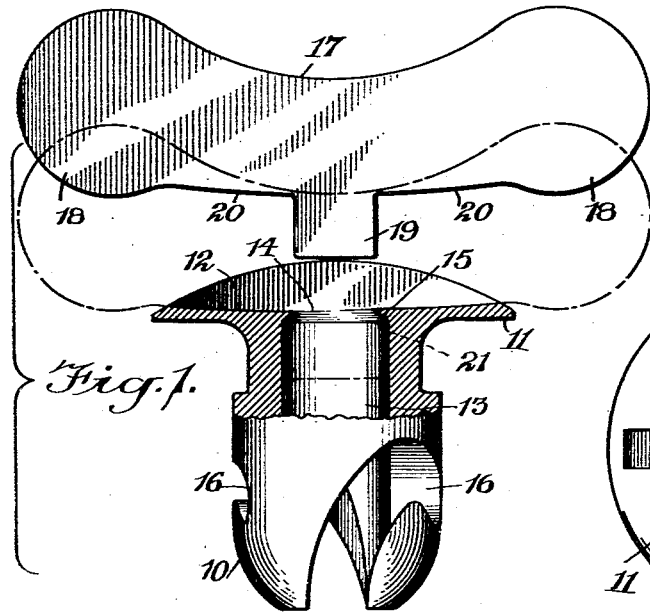
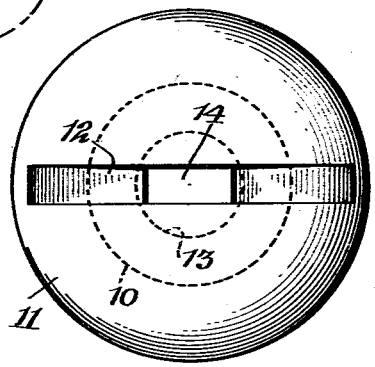
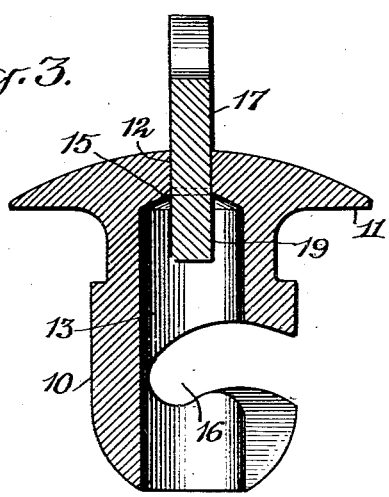
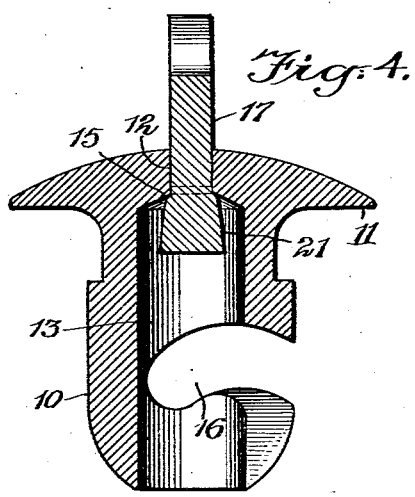
WITNESSES
INVENTOR
William Dzus
BY
Munn, Anderson & Liddy
ATTORNEYS Patented Sept. 15, 1936

2,054,519

UNITED STATES PATENT OFFICE 2,054,519

FASTENER HANDLE

William Dzus, West Islip, N. Y.

Application August 1, 1935, Serial No. 34,290

5 Claims. (Cl. 24—221)

This invention relates to a fastener and handle therefor which are produced from separate pieces of stock and rigidly secured together.

More specifically, the invention relates to a hollow fastener which is employed by turning the same, and which is so constructed that a winged handle may be rigidly secured thereto for that purpose.

The invention is advantageous in uniting a handle with a fastener of the character disclosed in Letters Patent of the United States, No. 1,955,740, granted to me April 24, 1934.

The principal object of the invention is to unite or apply a handle to a fastener and analogous elements in such manner that the handle will be practicably and rigidly secured thereto, and so that the handle may be used for turning the same in carrying out fastening and unfastening operations, and also to impart great force, if necessary, to accomplish this purpose.

A further object of the invention is to effect a union between a handle and a hollow fastener by virtue of the structural features thereof when pressure is applied thereto to deform a portion of one of the parts.

The nature of the invention and its distinguishing features and advantages will appear when the following specification is read in connection with the accompanying drawing, in which:

Fig. 1 shows the handle or thumb piece and fastener separated, the fastener being shown partly in section, and the handle also being shown in dot and dash lines united to the fastener;

Fig. 2 is a view of the head end of the fastener;

Fig. 3 is a section through the fastener and handle before the handle is united to the fastener; and Fig. 4 is a view similar to Fig. 3, but showing the handle united to the fastener.

Referring now more particularly to the several views of the drawing, it will be apparent that there is shown by way of example a fastener which consists of a cylindrical body 10 which has a head 11 on one end. The head 11 is provided with a transverse groove 12. This groove is cut in the head by the use of a milled cutter. The opposite sides of the groove 12 are parallel to each other and the body of the groove is curved or cut on a radius, due to the fact that a rotary milling cutter is used to form the groove 12. The body 10 is of hollow construction, due to the fact that it is drilled or bored out as indicated at 13. In forming the bore 13 in the body 10, a hole 14 is formed by virtue of which the bore 13 communicates with the groove 12. The hole 14 is rectangular in shape, the same being equal in width to the width of the groove 12 and shorter in length than the diameter of the bore 13. A shoulder 15 is thus formed which surrounds the hole 14 between the groove 12 and the bore 13. The body 10 has spiral slots 16 therein which open through the open end of the body 10 to provide means whereby the fastener element may be brought into interlocking engagement with a cooperative element by turning the fastener herein described.

In accordance with the invention use is made of a separate piece of flat stock to produce a handle 17 which provides wings 18 and a projecting portion 19 integral therewith and disposed centrally of the handle. The handle 17 has curved edge portions 20 at opposite sides of the portion 19, and the curvature of these portions 20 conforms to the curvature of the bottom wall of the groove 12, as shown most clearly in Fig. 1. The handle 17 partly fits in the groove 12 and the portion 19 fits in the hole 14 with its inner end projecting into the bore 13. By the use of a suitable punch the portion 19 is deformed or crushed, as at 21, against the shoulder 15, thus rigidly securing or uniting the handle 17 and the fastener. By uniting the handle and the body 10 in the manner described, a complete fastener element will be produced which will be rugged and enable a person to impart great force, if necessary, in effecting the interlocking engagement of the fastener element with a cooperative fastener element of a resilient nature, as disclosed in the aforesaid patent granted to me.

I claim:

1. In a device of the character described, a fastener element having a transverse groove in one end and a bore extending longitudinally therein communicating at one end with the groove to provide a hole and a shoulder between the groove and bore, and a handle partly fitting in the groove and having a portion extending into said bore through said hole, the inner end of said portion having a head formed thereon to rigidly secure the handle to one end of said element.

2. In a device of the character described, a fastener element having a transverse groove in one end and a bore extending longitudinally therein communicating at one end with the groove to provide a hole and a shoulder between the groove and bore, and a handle formed to provide wings and a projecting portion integral with the wings, said handle partly fitting in the groove and said projecting portion extending into said bore through said hole, the inner end of said portion having a head formed thereon which bears on said shoulder to thus rigidly secure the handle to one end of said element.

3. In a device of the character described, a member having an enlargement on one end, said enlargement having a transverse groove therein, said member having a longitudinal bore therein communicating at one end with said groove so as to provide a hole surrounded by a shoulder between the groove and bore, and a handle partly fitting in said groove and having a portion extending into said bore through said hole, the inner end of said portion having a head formed thereon which bears on said shoulder to thus rigidly secure the handle to one end of said element.

4. In a device of the character described, a fastener element having a transverse groove in one end and whose sides are parallel and whose bottom is curved, and also having a longitudinal bore therein communicating at one end with said groove to provide a rectangular hole surrounded by a shoulder between the groove and bore, and a handle partly fitting in said groove and having a portion integral therewith extending into said bore through said hole, the inner end of said portion having a head formed thereon to rigidly secure the handle to one end of said element.

5. In a device of the character described, a fastener body of hollow construction having an enlargement on one end, said enlargement having a groove extending transversely therein, said body having a hole therein between the ends of the groove and occurring in the bottom wall thereof and communicating with the interior of the body, and a handle made of flat stock, said handle partly fitting in said groove and having an intermediate projecting portion which extends into the body through said hole, the inner end of said portion having a head formed thereon to rigidly secure the handle to one end of said body.

WILLIAM DZUS.